United States Patent
Pfeiffer et al.

(10) Patent No.: US 10,962,445 B2
(45) Date of Patent: Mar. 30, 2021

(54) METHOD FOR CONTROLLING A LOAD MACHINE DURING A TEST RUN WITH A DRIVE TRAIN AND TEST STAND

(71) Applicant: AVL LIST GmbH, Graz (AT)

(72) Inventors: Klaus Pfeiffer, Eich (DE); Martin Schmidt, Langen (DE)

(73) Assignee: AVL LIST GmbH, Graz (AT)

( * ) Notice: Subject to any disclaimer, the term of this patent is extended or adjusted under 35 U.S.C. 154(b) by 144 days.

(21) Appl. No.: 16/466,986

(22) PCT Filed: Dec. 5, 2017

(86) PCT No.: PCT/EP2017/081454
§ 371 (c)(1),
(2) Date: Jun. 5, 2019

(87) PCT Pub. No.: WO2018/104270
PCT Pub. Date: Jun. 14, 2018

(65) Prior Publication Data
US 2019/0310162 A1    Oct. 10, 2019

(30) Foreign Application Priority Data
Dec. 5, 2016   (AT) .............................. A 51102/2016

(51) Int. Cl.
G01M 17/007    (2006.01)
G01M 13/025    (2019.01)

(52) U.S. Cl.
CPC ...... *G01M 13/025* (2013.01); *G01M 17/0072* (2013.01)

(58) Field of Classification Search
CPC .............. G01M 15/044; G01M 15/05; G01M 17/0072
(Continued)

(56) References Cited

U.S. PATENT DOCUMENTS

| 2006/0106526 A1* | 5/2006 | Sugita | ........................ G01L 3/24 |
| | | | 701/114 |
| 2008/0190183 A1* | 8/2008 | Erlach | ................. G01M 15/044 |
| | | | 73/114.01 |

(Continued)

FOREIGN PATENT DOCUMENTS

| AT | 508031 A4 | 10/2010 |
| AT | 515110 A4 | 6/2015 |

(Continued)

OTHER PUBLICATIONS

Rahul Ahlawat et al: "Engine Torque and Wheel Slip Emulation for Transmission-in-the-loop Experiments", 2010 IEEE/ASME International Conference on Advanced Intelligent Mechatronics, Montreal, Canada, Jul. 6-9, 2010, pp. 688-695.

(Continued)

*Primary Examiner* — Eric S. McCall
(74) *Attorney, Agent, or Firm* — Whitmyer IP Group LLC

(57) ABSTRACT

The present teaching includes a speed control of a side shaft of a drive train connected to a dynamometer on a drive train test stand in which a torque ($M_{Fxi}$) caused by the longitudinal force ($F_{Xi}$) calculated in a simulation model is additionally transferred to the control unit, and from this a compensation torque ($M_{Ki}$) is calculated in the control unit as a function of the longitudinal force ($F_{Xi}$) caused by the torque ($M_{Fxi}$) and a deviation ($A_{Ji}$) between a moment of inertia ($J_{Bi}$) of the dynamometer and a moment of inertia ($J_{Ri}$) of the simulated vehicle wheel, the control unit calculates a torque ($M_{REi}$) from the setpoint speed ($n_{Bi,set}$) with a speed controller and a torque ($M_{Bi,soll}$) to be set with the dynamometer is calculated as the sum of the compensation torque ($M_{Ki}$) and the torque ($M_{REi}$) calculated by the speed controller and set by the dynamometer.

12 Claims, 4 Drawing Sheets

(58) Field of Classification Search
USPC .............. 73/116.05, 116.06, 116.07, 118.01, 73/118.02
See application file for complete search history.

(56) References Cited

U.S. PATENT DOCUMENTS

| | | | |
|---|---|---|---|
| 2009/0100919 A1* | 4/2009 | Sugita | F02D 41/1497 73/114.15 |
| 2010/0005875 A1* | 1/2010 | Pickl | G01M 13/025 73/116.02 |
| 2011/0000291 A1* | 1/2011 | Mayrhofer | G01M 15/02 73/116.05 |
| 2011/0167890 A1* | 7/2011 | Cottogni | G01L 25/003 73/1.09 |
| 2015/0219529 A1 | 8/2015 | Akiyama et al. | |
| 2018/0143101 A1* | 5/2018 | Pfister | G01M 17/0074 |
| 2019/0011329 A1* | 1/2019 | Merl | G01M 17/007 |

FOREIGN PATENT DOCUMENTS

| | | |
|---|---|---|
| DE | 3801647 A1 | 8/1989 |
| EP | 1037030 A2 | 9/2000 |
| EP | 2161560 A2 | 3/2010 |
| JP | 2009276304 A | 11/2009 |

OTHER PUBLICATIONS

Bauer, Robert: "Neues Regelkonzept fur die dynamische Antriebsstrangprüfung", 17. Steirisches Seminar uber Regelungstechnik and Prozessautomatisierung (2011), Tagungband S. 104-116, Abschnitt 3: 17th Styrian Seminar on Control Engineering and Process Automation from Sep. 5-8, 2011, conference volume pp. 104-116.
Austrian Search Report Application No. A51102/2016 Completed: Oct. 30, 2017 1 Page.

* cited by examiner

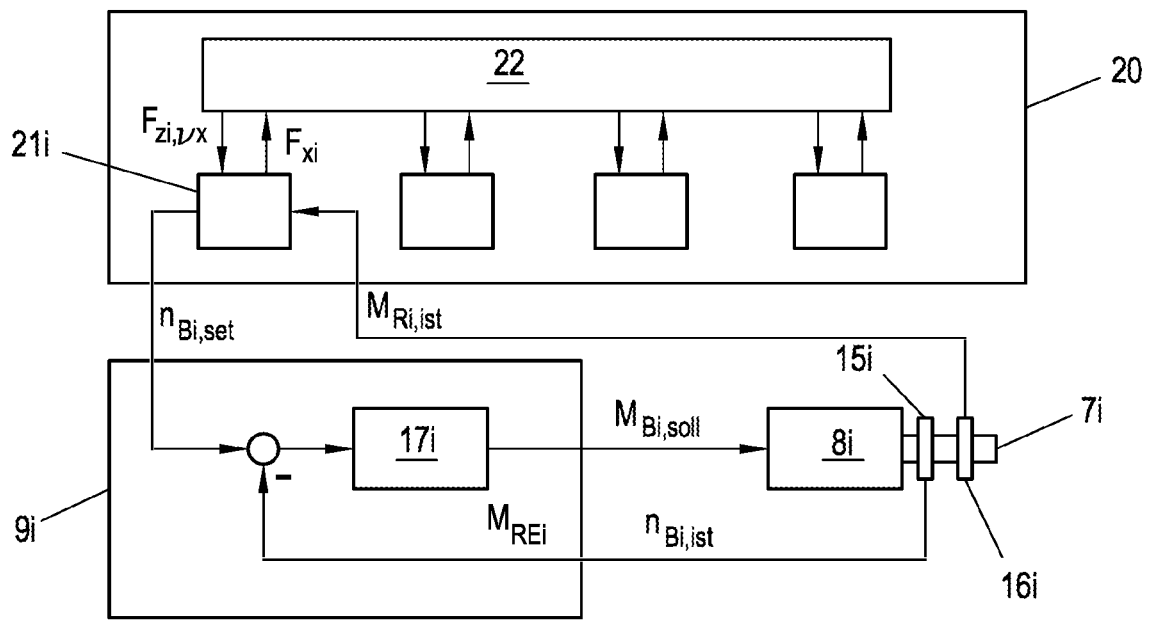
Fig. 4    State of the art
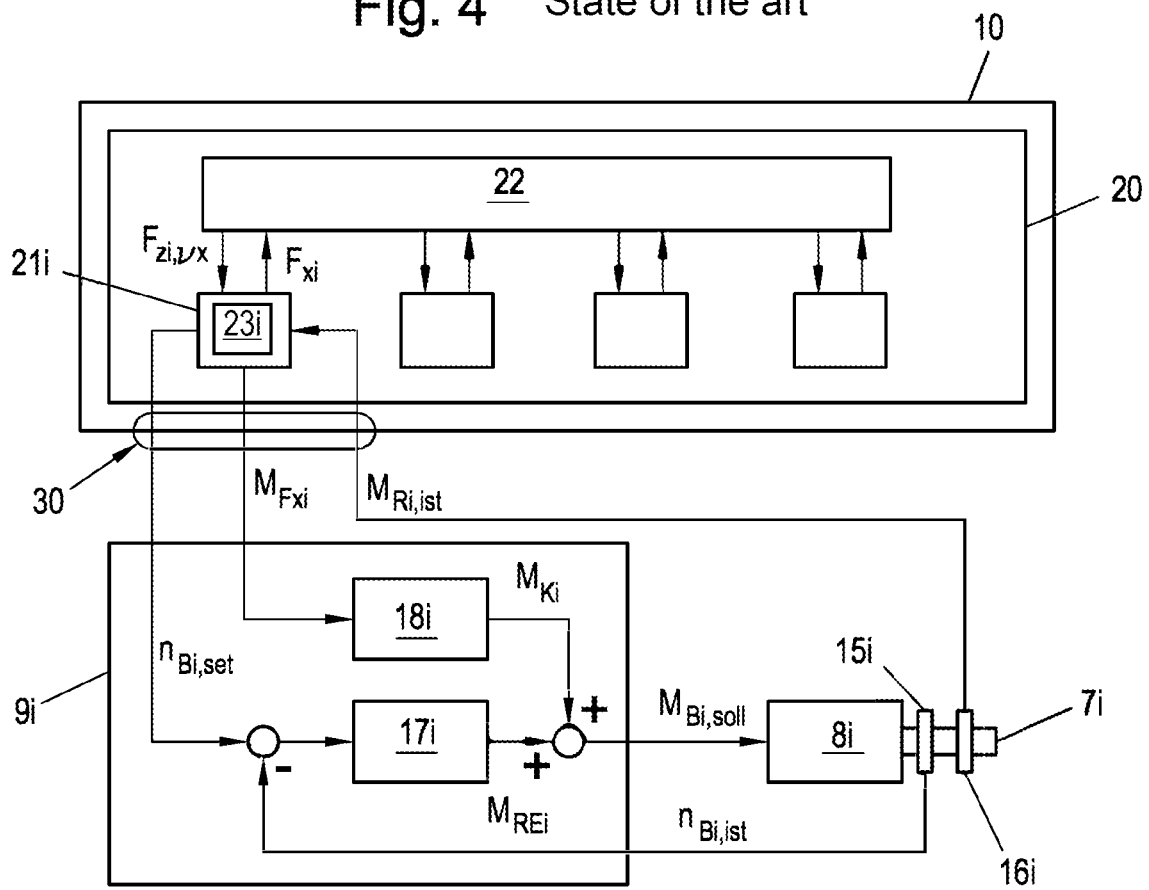
Fig. 5

METHOD FOR CONTROLLING A LOAD MACHINE DURING A TEST RUN WITH A DRIVE TRAIN AND TEST STAND

TECHNICAL FIELD

The present teaching relates to a method for performing a test run on a drive train test stand on which a drive train is arranged having at least one side shaft and this side shaft is connected to a dynamometer and the speed of the side shaft is controlled in a control unit, wherein in a simulation model, a longitudinal force is calculated with the tire of a vehicle wheel simulated with the simulation model and a setpoint speed of the dynamometer to be set and the setpoint speed of the control unit is transferred as a setpoint value of the speed control of the dynamometer. Similarly, the present teaching relates to an associated drive train test stand.

BACKGROUND

In order to develop a drive train, it must often be tested during the development process, i.e., subjected to certain loads in accordance with a test run in order to test the response of the drive train. With the result of the tests, appropriate steps can then be taken to further develop or improve the drive train. There are several known approaches to testing a drive train.

The drive train can be installed, for example, in a real vehicle and test drives can be carried out with the vehicle, on a real road or on a test site. During the test drives, measurements can be made on the vehicle or on the drive train and evaluated after the test drive. Of course, this procedure is very expensive. In addition, a test drive is hardly reproducible, since a test driver is not able to run a test drive several times exactly the same way. Driving robots and shifting robots (if a manual transmission is available) could be used on the test site in order to make the test drive more reproducible, but this significantly increases the effort further. Such test drives are therefore rather disadvantageous and are used today, if at all, only in a very late stage of development of a drive train or a vehicle. However, this is hardly suitable for an early stage of development, where frequent changes and tests are necessary.

Instead of a real test drive on the road, a chassis dynamometer could be used, where the vehicle is arranged on the chassis dynamometer on rollers of the test stand. But with such chassis dynamometers, due to the high inertia of the rollers, dynamic tests (in the sense of a rapid or transient change in the manipulated variables, such as speed and torque) are hardly possible. Chassis dynamometers are also therefore not suitable, or only to a very limited extent, for the testing of drive trains, at least not for very dynamic tests.

To overcome these problems, drive train test stands have already become known where at least at the driven side shafts of the drive train a dynamometer (for example, an electric motor) is arranged which imposes predetermined torques or speeds in the drive train to load the drive train and thus simulate a real drive of a vehicle with the drive train. The speed/torque to be set via the dynamometer (s) is calculated in a simulation model. The simulation model often includes a vehicle model, one (or more) wheel model(s), a road model, a driver model, and also other models that work together and together simulate the movement of the vehicle.

For example, EP 1 037 030 A2 describes a drive train test stand with a simulation model for simulating the movement of a vehicle. For the control of the test run, a tire model is used in combination with a vehicle model that calculates a setpoint value for the torque. The speed of the side shaft is measured and made available to the simulation model. The calculated setpoint value for the torque is provided directly to the dynamometer for implementation. The dynamometer is thus torque-regulated in an open loop. The disadvantage of this approach is that for realistic tests, the moment of inertia must correspond as closely as possible to the moment of inertia of the true wheel, which is normally arranged on the drive train. Since the moment of inertia of a wheel is usually low, this places high demands on the dynamometers. These must therefore be designed generally as electric synchronous machines, with their known disadvantages in terms of cost and reliability. Furthermore, a demanding adjustment of the torque in the inverter of the dynamometer is required.

In addition, an open-loop control, of course, has no possibility of compensating a control error, as in the case of a closed-loop control, and also provides no interference suppression. Thus, unavoidable, production-related or operational deviations of the individual dynamometers already have a direct (negative) influence on the control of the drive train test stand.

Such a drive train test stand is also disclosed in DE 38 01 647 C2 for a four-wheel drive train. The rotational speeds and the torques of the side shafts are measured on the drive train test stand and from this, setpoint speeds for the speed-controlled dynamometers on the side shafts are calculated in the simulation model. For the simulation model, however, a slightly different approach is chosen because a wheel model (which also includes the simulation of the tire) is used instead of a tire model. Therein the co-operation of the different models is also described in detail. For a dynamic test, in particular the consideration of tire slip is important, for which a tire model is needed. This is also described in DE 38 01 647 C2.

AT 508 031 B1 also shows a drive train test stand with vehicle model and wheel models and speed control of the dynamometers on the test stand.

The disadvantage of DE 38 01 647 C2 and AT 508 031 B1 is that the speed control causes a delay and damping, whereby the prevailing speed on the side shaft always lags behind the speed simulated in the simulation model speed. Thus, the current state of the drive train on the drive train test stand does not correspond to the desired, simulated state, which adversely affects the test of the drive train. In order to enable dynamic state changes, which are always to be expected during tests of a drive train, the speed controller must have a high gain, which has negative effects on the stability of the control. In the worst case, the speed control may become unstable, which could damage or even destroy the drive train test stand, or at least interrupt the test run. The controller must therefore be optimized to meet the requirements, which requires a more elaborate controller design or controller tuning.

To solve this problem, in Bauer, R., "Neues Regelkonzept für die dynamische Antriebsstrangprüfung", 17th Styrian Seminar on Control Engineering and Process Automation from Sep. 5-8, 2011, conference volume pp. 104-116 it was proposed to adapt the wheel model, which includes the tire model, in the simulation. However, this requires an intervention in the simulation environment and an exchange or adaptation of the wheel model. However, such interventions are often not acceptable to the operator of the drive train test stand, since usually known standard models for the wheel and the tire are used, and are therefore not possible. Often, the simulation environment with the simulation models already exists at an early development stage before being used on the test stand and is to be used unchanged at the test stand. The test stand only provides an interface at which a setpoint speed is output and through which the variables measured at the drive train test stand are transferred to the simulation model. Which wheel model is used in the simulation environment is therefore often not even known, whereby a change of the wheel model in practice is often hardly possible.

SUMMARY

It is therefore an object of the present teaching to solve the problems of the prior art.

This object is achieved in that the torque calculated in the simulation model and caused by the longitudinal force is additionally transferred to the control unit, and therefrom a compensation torque is calculated in the control unit as a function of the torque caused by the longitudinal force and a deviation between a moment of inertia of the dynamometer and a moment of inertia of the simulated vehicle wheel, wherein the control unit calculates a torque with a speed controller from the setpoint speed and a torque to be set with the dynamometer is calculated as the sum of the compensation torque and the torque calculated by the speed controller and is set by the dynamometer. Due to the compensation torque, it can be achieved that the dynamometer simulates the simulated vehicle wheel on the drive train test stand well despite different moments of inertia. The compensation torque acts as a master manipulated variable, which means that the speed controller only needs to compensate for any deviations that occur on the drive train test stand. The demands on the speed controller, for example on the gain, can thus also be reduced and at the same time the dynamics of the speed controller (in the sense of a change rate of the manipulated variable) and the speed can be improved. It can also be used to increase the stability of the speed controller.

Advantageously, the simulation model comprises a wheel model with a tire model and a vehicle model. Thus, standard models can be used, which facilitates the simulation.

The compensation torque can be easily calculated by using, as a deviation, a quotient of the moment of inertia of the dynamometer and the moments of inertia of the simulated vehicle wheel or a difference of the moments of inertia of the simulated vehicle wheel and the moment of inertia of the dynamometer.

BRIEF DESCRIPTION OF THE DRAWINGS

In the following, the present teaching is described in greater detail with reference to FIGS. 1 to 6 which, by way of example, show schematic and non-limiting advantageous embodiments of the present teaching. In the drawings:

FIG. 4 shows a conventional speed control of a dynamometer on the drive train test stand, FIG. 5 shows a speed control according to the present teaching of a dynamometer on the drive train test stand.

DETAILED DESCRIPTION

Figure 1:
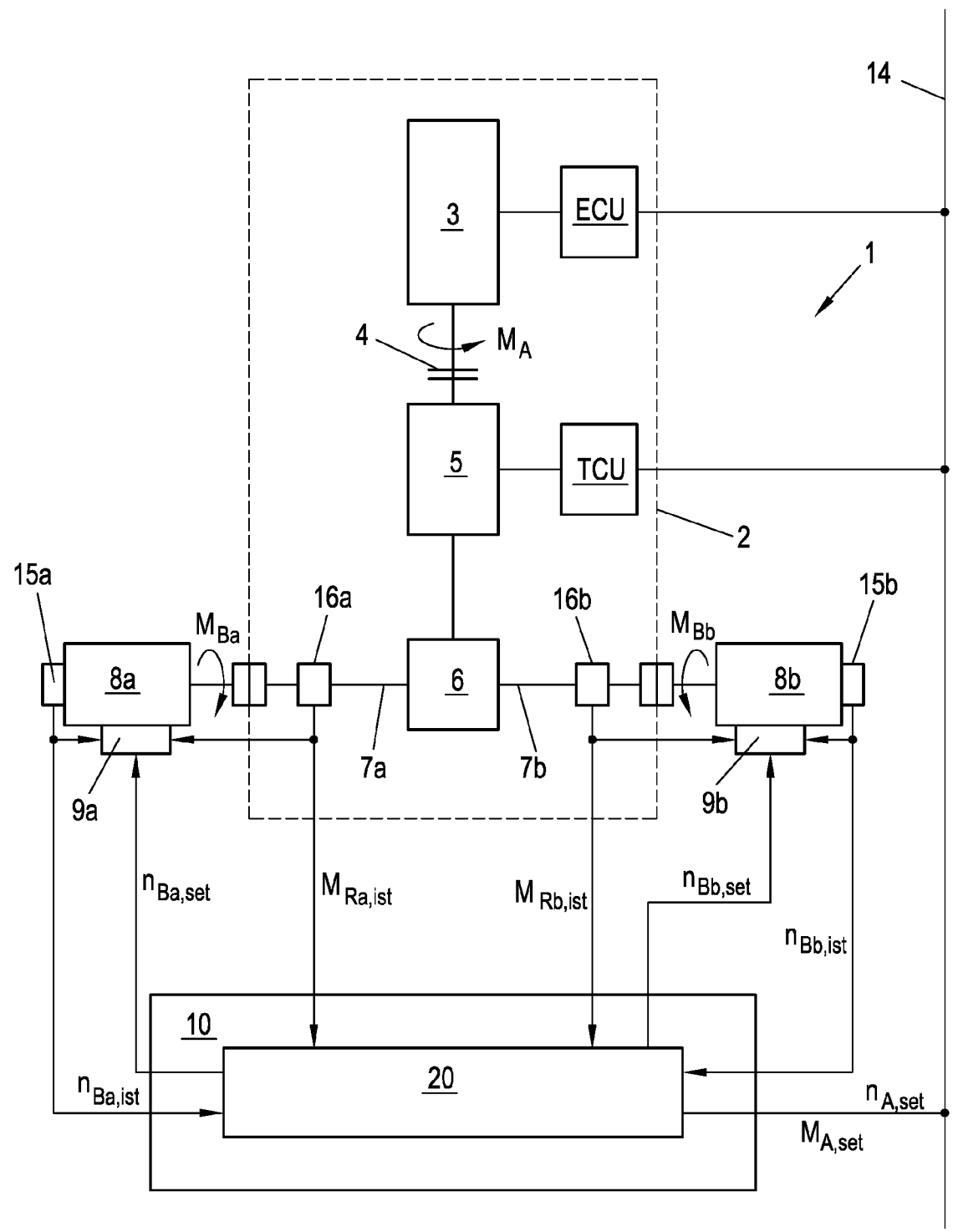
FIG. 1 shows an embodiment of a drive train test stand with a drive train as a test specimen.

FIG. 1 schematically shows a drive train test stand 1 for a drive train 2. The necessary, known test stand structures for transport, arrangement, storage and fixation of the drive train 2 and the other components on the drive train test stand 1 are not shown for reasons of clarity. In the exemplary embodiment shown, the drive train 2 comprises a drive unit 3, for example an internal combustion engine or an electric motor or a combination thereof, which is connected to a transmission 5 via a clutch 4 by means of a drive shaft. The transmission 5 is connected to a differential 6, via which in turn two side shafts 7a, 7b of the drive train 2 are driven. Dynamometers 8a, 8b, for example, electric motors, are arranged on the driven side shafts 7a, 7b of the drive train 2. The dynamometers 8a, 8b are arranged in a known manner and connected torque-proof to the side shafts 7a, 7b in order to be able to transmit a torque. For example, the dynamometers 8a, 8b are flanged to the wheel flange of the side shaft 7a, 7b. Of course, the drive train 2 could be implemented in the same way as a four-wheel drive train. In this case, dynamometers could be arranged in an analogous manner on all driven side shafts. Likewise, other drive concepts and designs of the drive train 2 are conceivable, such as a purely electrically driven axle (also in combination with a differently driven axle), or the use of wheel hub motors. Likewise, it does not matter how many axles or how many driven axles are present and how many wheels are arranged on an axle.

The drive train 2 may also include control units, such as an engine control unit ECU or a transmission control unit TCU, in order to control the components of the drive train 2, in particular the drive unit 3, or optionally the drive units.

The specific embodiment of the drive train 2 is irrelevant to the present teaching. All that is decisive is that at least one dynamometer 8a, 8b can be connected to at least one side shaft 7a, 7b. This is preferably a driven side shaft 7a, 7b, but it may also be a non-driven side shaft. The arrangement on a non-driven side shaft, for example, makes sense, if you also want to simulate a brake on a side shaft or the braking behavior.

In addition, a test stand automation unit 10 is provided on the test stand 1, which controls the test run to be performed on the test stand 1. The test stand automation unit 10 is designed, for example, as a computer, or as a network of cooperating computers, with the required software. The test stand automation unit 10 controls, in particular, the dynamometers 8a, 8b, but also components of the drive train 2, in particular the drive unit 3 or the transmission 5. This can also be done via the control units ECU, TCU, for example by an accelerator pedal position being transmitted from the test stand automation unit 10 to the engine control unit ECU. The connection between the test stand automation unit 10 and the components of the drive train 2 or the drive train test stand 1 can also take place via a data bus 14, for example a conventional vehicle bus, as indicated in FIG. 1. However, the type of control of the components of the drive train 2 is irrelevant to the present teaching.

In the test stand automation unit 10, a simulation model 20 is implemented, in the form of simulation hardware and/or simulation software, that simulates the movement of a virtual (i.e., simulated) vehicle with the drive train 2 through a virtual (i.e., simulated) test environment along a virtual route. The virtual test environment defines at least the virtual route (curves, gradients, road slopes, road surface). For this purpose, the route can be defined in advance. Often, real-world vehicles drive real distances and measure certain parameters (e.g., curves, gradients, road gradients, road surface (tire grip), vehicle speed, etc.). From such a real trip, a virtual route can then be generated. Likewise, a driving profile can be obtained from the real drive, so for example, the vehicle speed or a shifting action at certain points of the route or a speed change at certain points. The driving profile is implemented in the virtual test environment by a virtual driver, and for this purpose, different driver profiles can be defined, for example, a conservative or an aggressive driver, for example, who implement a desired change in speed differently or drive through a curve differently. Route and/or driving profile can also be defined completely freely by a user, for example in a suitable editor. However, the driving profile can also be generated, at least partially, at the test stand during the test run, in which an interface (e.g. steering wheel, accelerator pedal, clutch, brake pedal) is made available on the test stand via which a real user can control the virtual vehicle in the virtual test environment, for example, steer, step on the gas, brake, shift, etc. But the route can also be supplemented by events, such as traffic signs, traffic along the route, puddles or ice slabs on the roadway, etc.

What the test run by the simulation of the virtual vehicle specifically looks like is irrelevant to the present teaching. It is only important that a movement of a virtual vehicle, in particular the statics, the dynamics, i.e., speeds and accelerations in space, and the interaction of a tire of the vehicle with the road are simulated in this movement. The simulation model 20 provides in predetermined time steps of the simulation, for example, with a frequency of 10 kHz, setpoint values for the drive unit 3, for example, a setpoint speed $n_{A,set}$, a setpoint torque $M_{A,set}$, a setpoint electric current or a setpoint electrical voltage set by the drive unit 3. Likewise, setpoint values for other components of the drive train 2 can be determined and transmitted, for example a shift command for the transmission 5. At the same time, the simulation model 20 supplies in the predetermined time steps of the simulation setpoint values for the dynamometers 8a, 8b used, preferably a setpoint speed $n_{Ba,set}$, $n_{Bb,set}$. In this way, the drive train 2 on the drive train test stand 1 "experiences" substantially the same conditions that the simulated vehicle would experience when driving along the simulated test track.

The dynamometers 8a, 8b are controlled in a known manner in each case by an associated control unit 9a, 9b. For this purpose, a control unit 9a, 9b receives the setpoint value for the assigned dynamometer 8a, 8b, according to the present teaching a setpoint speed $n_{Ba,set}$, $n_{Bb,set}$, and controls this by means of the implemented controller, for example a known PI controller or a PID controller. Of course, the setpoint values for the individual dynamometers 8a, 8b do not need to be the same.

To calculate the setpoint values and also to control the dynamometers 8a, 8b with the control units 9a, 9b, current values of the drive train 2 are measured on the drive train test stand 1, for example an actual speed $n_{Ba,ist}$ $n_{Bb,ist}$ of a dynamometer 8a, 8b with a speed measuring unit 15a, 15b and/or an actual torque $M_{Ra,ist}$, $Mb_{Rb,ist}$ of a side shaft 7a, 7b with a torque measuring unit 16a, 16b, as indicated in FIG. 1. Instead of directly measuring these quantities, they could also be calculated by means of an observer from other measured quantities of the drive train 2. Likewise, these could be calculated from a model of the drive train 2. Likewise, other quantities could also be measured, calculated or estimated, such as a shaft torque $M_{Ba}$, $M_{Bb}$ of the dynamometer 8a, 8b.

Figure 2:
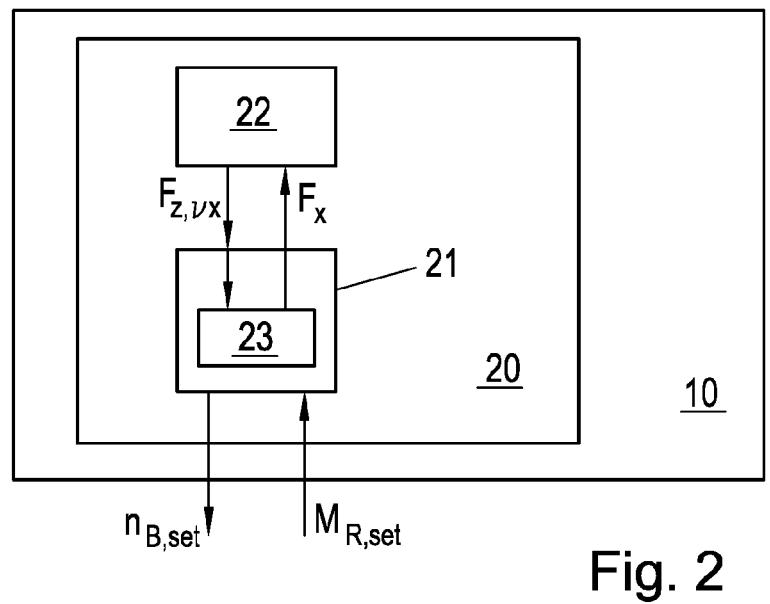
FIG. 2 shows an advantageous model structure of the simulation model.

To implement the simulation of the movement of the virtual vehicle, at least a vehicle model 22 which simulates the movement of the vehicle along the route, and a wheel model 21 with an integrated tire model 23 are required in the simulation model 20, as shown in FIG. 2. The wheel model 21 with the tire model 23 simulates the interaction of the wheel/tire with the environment, that is to say specifically with the road of the test track. In the tire model 23, the transmission of power from the tire 11 to the road is usually simulated and the wheel model 21 simulates the dynamics with the inertia of the vehicle wheel and with the forces/moments of the power transmission.

Figure 3:
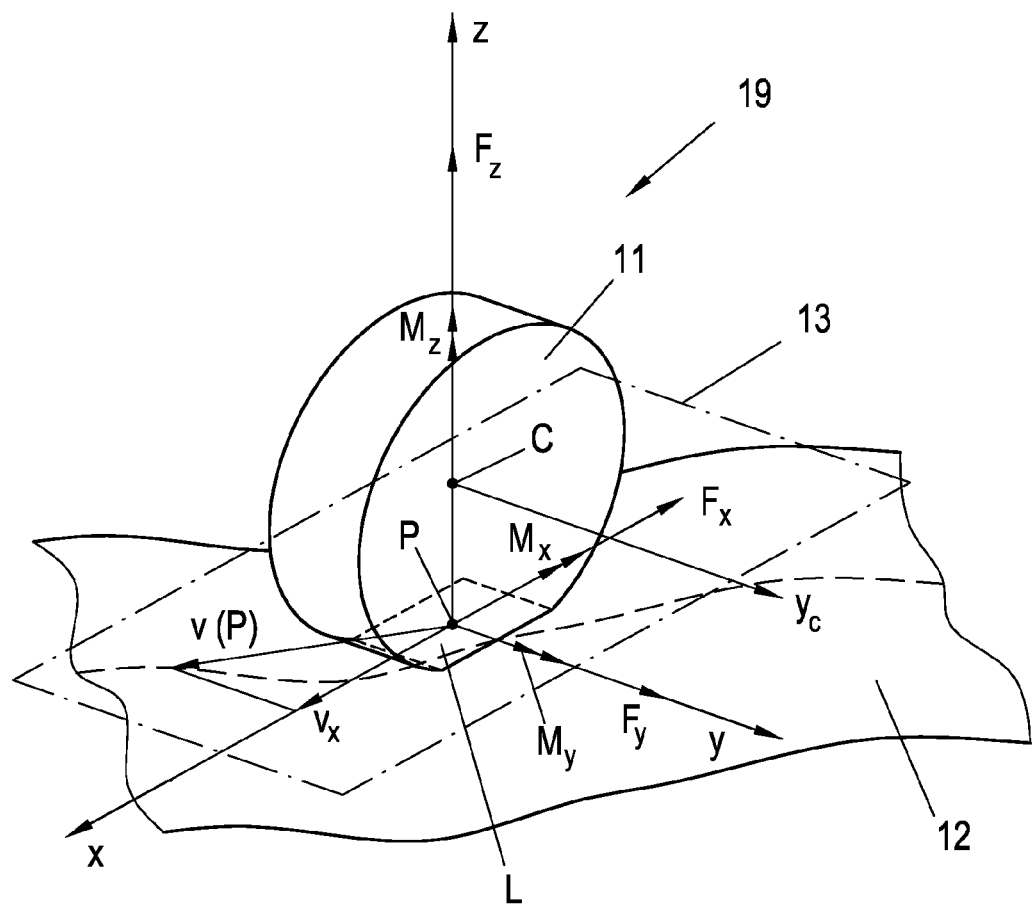
FIG. 3 shows an exemplary tire coordinate system.

For this purpose, a coordinate system based on the tire 11 can be used, as shown in FIG. 3. Here, a tire 11 of a vehicle wheel 19 is shown schematically on a generally curved roadway 12. The tire 11 stands on the roadway 12 at the wheel contact point P (FIG. 13 shows the tangential plane 13 on the curved roadway 12 in the wheel contact point P) and the tire 11 rotates about the wheel center C about a rotation axis $y_c$. The tire 11 does not stand in a point P on the roadway 12, but on a tire contact area, which is commonly referred to as a contact patch L. The x-axis corresponds to the toe of the tire 11. The y-axis is the parallel of the rotational axis $y_c$ through the wheel contact point P and the z-axis is the connecting straight line through the wheel contact point P and the wheel center point C. The wheel contact point P is thus the point which minimizes the distance between the curved roadway 12 and the wheel center point C. This results in the tire 11 according to the selected coordinate system, a vertical force $F_z$, a longitudinal force $F_x$ in the direction of the toe and a lateral force $F_y$, a rolling resistance torque $M_y$, a drilling torque $M_z$ and a tilting torque $M_x$. These forces and torques are collectively referred to as tire force winder. The speed of the wheel contact point P of the vehicle observed in a roadway-fixed coordinate system is denoted by V(P). The projection of V(P) on the toe is called the longitudinal speed of the vehicle and is abbreviated to $v_x$. A lateral velocity of the vehicle in the y-direction results in the same way.

The wheel model 21 could then, for example, be implemented as an equation of motion of the form $$J_W \ddot{\alpha} = M_y + \underbrace{F_x r}_{M_{Fx}} + M_R [+M_B + M_{aux}]$$

with the following variables:
moment of inertia of the simulated vehicle wheel Jw, rotational acceleration $\ddot{\alpha}$ with the rotation angle $\alpha$ (which can be measured, also as an analogous variable such as the speed), rolling resistance torque $M_y$, longitudinal force $F_x$, radius of the vehicle wheel r, a torque $M_R$ acting on the side shaft, for example, which is impressed by the drive unit 3 into the drive train 2, and other optional variables, such as a braking torque $M_B$ and any additional moments $M_{aux}$, such as friction torques, drag torques, etc. The torques as algebraic quantities must be used with their correct algebraic signs. The mechanical connection between dynamometer 8a, 8b and side shaft 7a, 7b is generally regarded as, at least as sufficiently, stiff, so that the angle of rotation a can be derived in most cases from the measured actual speed $n_{Ba,ist}$, $n_{Bb,ist}$ of the dynamometer 8a, 8b. The quantities brake torque $M_B$ and drive torque $M_R$ are either measured or are known from the test run, or are calculated or estimated in an observer from other variables measured on the drive train test stand 1. In any case, the wheel model 21 takes into account a torque $M_{Fx}$ as quantity of the tire 11 of the simulated vehicle wheel 19, which results from a longitudinal force $F_X$, which is applied by the tire 11, preferably as an additional tire quantity also a rolling resistance torque $M_y$.

At least the longitudinal force $F_X$ is thereby calculated in the tire model 23 of the wheel model 21, but usually also at least the rolling resistance torque $M_y$ and often also the lateral force $F_y$ and the drilling torque $M_z$, which tries to turn back the turned wheel. According to the current acting statics and dynamics (position, speed, acceleration) of the virtual vehicle, but also as a result of implemented drive concepts such as an active torque distribution, the acting tire forces and tire torque on the individual wheels of the vehicle of course do not need to be the same.

Any known tire model 23 may be used to calculate the required tire forces and/or torques. Known tire models are for example a Pacejka model, a TameTire model, an Ftire model, a Delft-Tire model or an MF-SWIFT model. Frequently, the Pacejka model is used, for example, which is described in Pacejka H. B., et al., "Tire Modeling for Use in Vehicle Dynamics Studies", International Congress and Exposition, Detroit, Feb. 23-27, 1987, SAE Technical Paper 870421. These tire models are well known and therefore will not be described in detail. In essence, a tire model calculates at least some of the aforementioned acting tire forces and/or tire torques. But which tire model is used is irrelevant to the present teaching. Likewise, in the wheel model 21 or in the tire model 23, the longitudinal slip and/or the transverse slip of the tire 11 can be taken into account, for example via a known relationship between the longitudinal force $F_X$ and lateral force $F_y$ and the longitudinal slip and transverse slip. This relationship can be stored, for example, in the form of a diagram or characteristic diagram, as described, for example, in EP 1 037 030 A2.

The conventional known control of a dynamometer 8i on a drive train test stand 1, as described for example in DE 38 01 647 C2 or AT 508 031 B1, is shown in FIG. 4. The description is subsequently made only for one dynamometer 8i as a simulation for the i-th simulated vehicle wheel, but this also applies analogously to the other dynamometers used on the drive train test stand 1. In the vehicle model 22, for example, the longitudinal forces $F_{Xi}$ at the driven vehicle wheels and from other known or parameterized geometrical or kinematic quantities, such as the vehicle mass, the road gradient, the road inclination, the slip angle of the i-th wheel, the currently acting slip, the air resistance, the pitching and rolling motion of the vehicle, the road condition, etc., the state variables of the vehicle, in particular the longitudinal speed $v_x$ of the vehicle and in most cases also the yaw rate are calculated. In the vehicle model 22, the current vertical forces $F_{zi}$ are also calculated as tire contact forces on the vehicle wheels from the current acting statics (weight force) and dynamics (position, speed, acceleration in space) of the simulated vehicle. From this, along with a coefficient of adhesion between road and tire, the longitudinal force $F_X$ on a wheel can be calculated, for example, in the tire model 23 of the wheel model 21. In the wheel model 21i of the i-th vehicle wheel, or in the tire model 23i integrated therein, a rolling resistance torque $M_{yi}$ of the i-th vehicle wheel may also be calculated. For this purpose, the actual torque $M_{Ri,ist}$ is determined (measured (torque measuring unit 16i, estimated) on the side shaft 7i and provided to the wheel model 21i. At least from the longitudinal velocity $v_x$ of the simulated vehicle and the vertical force $F_{zi}$, and optionally an actual speed $n_{Bi,act}$ of the i-th vehicle wheel, and the actual torque $M_{Ri,ist}$ on the associated side shaft 7i, and optionally also with the rolling torque $M_{yi}$ and other torques, the longitudinal force $F_{Xi}$ is calculated, which in turn is provided to the vehicle model 22. For this purpose, of course, required parameters, such as a current coefficient of adhesion between the route and tire 11 or a slip angle are also available. Likewise, in the calculation of the longitudinal force $F_{Xi}$, in particular for realistic and also highly dynamic test runs, the slip can also be taken into account. From the longitudinal velocity $v_x$ calculated in the current time step of the simulation, the setpoint rotational speed $n_{Bi,set}$ to be set the side shaft 7 by the dynamometer 8i is calculated in the wheel model 21i, which is transmitted to the associated control unit 9i with an implemented rotational speed controller 17i as the setpoint value of the control. The speed controller 17i calculates therefrom a control torque $M_{REi}$ according to the implemented controller, which is transferred to the dynamometer 8i as torque $M_{Bi,soll}$ to be set. This manipulated variable for the dynamometer 8i is converted in the power electronics (e.g. an inverter) of the dynamometer 8i in a known manner into an electric motor current. The speed controller 17i is designed, for example, as a conventional feedback controller which regulates a control error as a deviation between an actual speed $n_{Bi,ist}$ (measured (speed measuring unit 15i, for example) of the side shaft 7i and the setpoint speed $n_{Bi,set}$.

The speed control of a dynamometer 8i according to the present teaching will now be explained with reference to FIG. 5. Compared to the conventional control as described with FIG. 4, the speed control of the dynamometer 8i is supplemented according to the present teaching by a moment of inertia compensation. The moment of inertia compensation compensates for the deviation between the known moment of inertia $J_{Bi}$ of the dynamometer 8i and the known moment of inertia $j_{Ri}$ of the virtual simulated vehicle wheel. In other words, this takes into account the deviation between the simulation and the reality on the drive train test stand 1 and reduces its influence.

For this purpose, the wheel model 21i also transfers at the interface 30 of the test stand automation unit 10 a torque $M_{Fxi}$, which is caused by the longitudinal force $F_{Xi}$, to the control unit 9i, in addition to the setpoint speed $n_{Bi,set}$, as in the prior art. Equivalently, of course, the longitudinal force $F_{Xi}$, possibly also with the radius of the vehicle wheel $r_i$, could be transferred. This is therefore also understood in the context of the present teaching as "transferring the torque $M_{Fxi}$". Since this torque $M_{Fxi}$ has to be calculated anyway in the wheel model 21i for carrying out the test run, it is not necessary to adapt the wheel model 21i. Merely the transfer of an additional variable between the simulation model 20 and the control unit 9i is to be provided, for example, an additional interface to the test stand automation unit 10 for transferring the torque $M_{Fxi}$, which is easy to implement.

In the control unit 9i, a compensation unit 18i is provided which calculates a compensation torque $M_{Ki}$ from the torque $M_{Fxi}$ and a deviation $A_{Ji}$ between a moment of inertia $J_{Bi}$ of the dynamometer and a moment of inertia $J_{Ri}$ of the simulated vehicle wheel, i.e. $M_{Ki}=f(M_{Fxi},A_{Ji})$. The calculated compensation torque $M_{Ki}$ is preferably recalculated in each time step of the control. This compensation torque $M_{Ki}$ is added to the torque $M_{REi}$, which is calculated in the speed controller 17i of the control unit 9i according to the implemented control law (e.g., a conventional PI or PID controller). This sum torque is then specified to the dynamometer 8i as torque $M_{Bi,soll}$.

Figure 6A:
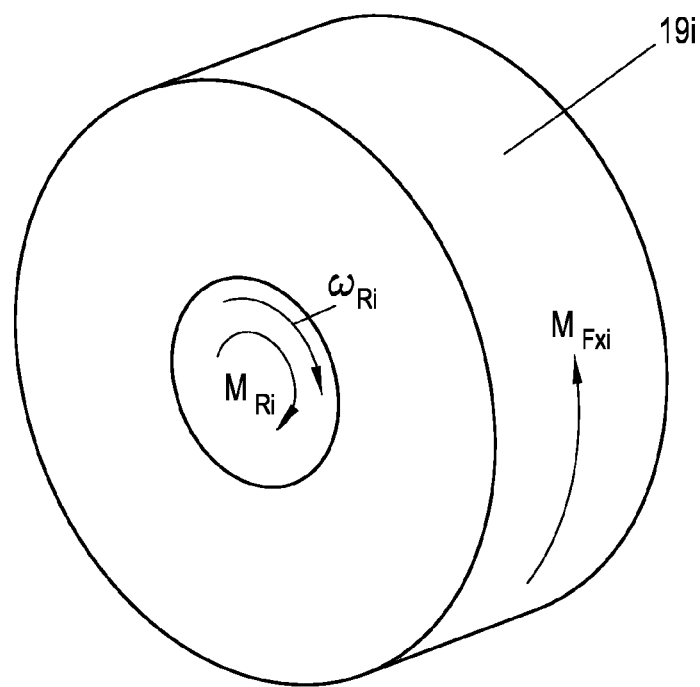
FIG. 6a shows the dynamic state variables on a vehicle wheel and FIG. 6b shows the dynamic state variables on the dynamometer.
Figure 6B:
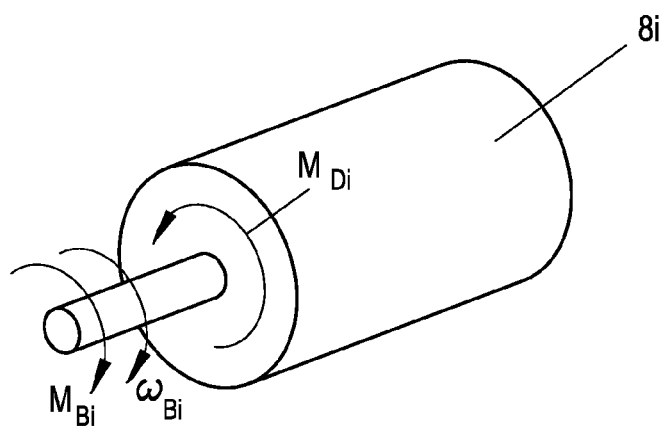

To determine the deviation $A_{ji}$ for the i-th vehicle wheel $19i$, the procedure may be as follows, reference being made to FIG. 6. On a vehicle wheel $19i$ with moment of inertia $J_{Ri}$, which rotates at the angular speed $\omega_{Ri}$, the torque $M_{Fxi}$, which is caused by the longitudinal force $F_{Xi}$, and the torque acting on the side shaft $7i$ $M_{Ri}$ (FIG. 6a) are acting. According to the principle of angular momentum, one gets $J_{Ri}\dot{\omega}_{Ri}=M_{Ri}-M_{Fxi}$. On the shaft of the dynamometer $8i$, which rotates at the angular speed $\omega_{Bi}$, a loading torque $M_{Bi}$ (FIG. 1) acts and the dynamometer $8i$ applies the torque $M_{Di}$ (FIG. 6b). According to the principle of angular momentum, one gets $J_{Bi}\dot{\omega}_{Bi}=M_{Bi}-M_{Di}$. The dynamometer $8i$ should now emulate the vehicle wheel $19i$ as well as possible on the drive train test stand 1. It can therefore be demanded that the rotational accelerations on the side shaft $7i$ and on the shaft of the dynamometer $8i$ are the same. i.e. $\dot{\omega}_{Ri}=\dot{\omega}_{Bi}$, from which it is possible to derive directly from the two principle of angular momentum equations $$M_{Di} = \frac{J_{Bi}}{J_{Ri}}M_{Fxi} + M_{Ri} - \frac{J_{Bi}}{J_{Ri}}M_{Bi}.$$

Assuming an (at least sufficiently) high mechanical rigidity of the mechanical connection of the dynamometer $8i$ to the drive train 2, the torque $M_{Ri}$ acting on the side shaft $7i$ can be equated with the torque $M_{Bi}$ of the dynamometer $8i$ for the sake of simplicity, which leads to $$M_{Di} = \frac{J_{Bi}}{J_{Ri}}M_{Fxi} + \left(1 - \frac{J_{Bi}}{J_{Ri}}\right)M_{Ri}.$$

Therefore, only one of the two torques has to be determined on the drive train test stand 1. Thus, the deviation $A_{ji}$ is realized as quotient of the moment of inertia $J_{Bi}$ of the dynamometer $8i$ and the moment of inertia $J_{Ri}$ of the simulated vehicle wheel $19i$. Alternatively one can also demand $M_{Bi}=M_{Ri}$, from which one can derive directly from the two principle of angular momentum equations $$M_{Di}=M_{Fxi}+J_{Ri}\dot{\omega}_{Ri}-J_{Bi}\dot{\omega}_{Bi}.$$

Assuming an (at least sufficiently) high mechanical rigidity of the mechanical connection of the dynamometer $8i$ to the drive train 2, the speed $n_{Ri}$ (or $\omega_{Ri}$) on the side shaft $7i$ can be equated with the speed $n_{Bi}$ (or $\omega_{Bi}$) of the dynamometer $8i$ for the sake of simplicity, which leads to $$M_{Di}=M_{Fxi}+(J_{Ri}-J_{Bi})\dot{\omega}_{Ri}.$$

Therefore only one of the two speeds has to be determined on the drive train test stand 1. Thus, the deviation $A_{ji}$ is realized as the difference between the moment of inertia $J_{Ri}$ of the simulated vehicle wheel $19i$ and the moment of inertia $J_{Bi}$ of the load machine $8i$. If the inertia moments $J_{Bi}$, $J_{Ri}$ are equal, the equations are reduced to $M_{Di}=M_{Fxi}$. The torques $M_{Bi}$ and/or $M_{Ri}$, or the speeds $n_{Bi}$ and/or $n_{Ri}$ can in turn be measured, calculated or estimated and can therefore be assumed to be known for the moment of inertia compensation.

So that the dynamometer $8i$ emulates the vehicle wheel $19i$ well despite different moments of inertia $J_{Ri}$, $J_{Bi}$, the dynamometer $8i$ would therefore have to apply the torque $M_{Di}$. The compensation torque $M_{Ki}$ is therefore set equal to this torque $M_{Di}$. The compensation torque $M_{Ki}$ can therefore also be seen as a master manipulated variable, with the speed controller $17i$ then only having to compensate for any deviations. The requirements of the speed controller $17i$, for example of the gain, can thus also be reduced and at the same time the dynamics of the speed controller $17i$ (in terms of a rate of change of the manipulated variable) and the speed can be improved. Likewise, this can increase the stability of the speed controller $17i$.

Of course, other tire quantities, in particular a rolling resistance torque $M_{yi}$, could also be taken into account in the above-described principles of angular momentum equations for the vehicle wheel $19i$. This would require further interfaces between the simulation model 20 and the control unit 9.

For the present teaching, it is irrelevant how the drive train 2 is arranged on the drive train test stand 1. The whole real vehicle could also be arranged on the drive train test stand 1 and only the vehicle wheels, at least the driven ones, could be replaced by dynamometers $8i$. Likewise, the real vehicle with vehicle wheels could be arranged on a roller on the drive train test stand 1. The dynamometer $8i$ would drive the roller and thus act indirectly on the drive train 2 and the dynamometer $8i$ would thereby be indirectly connected to a side shaft. Also, a plurality of rollers could be provided, for example, one roller per driven vehicle wheel or per axle. With such a roller test stand, however, it would then normally not be possible to carry out test runs with high dynamics.

The invention claimed is:

1. A method for carrying out a test run on a drive train test stand on which a drive train with at least one side shaft is arranged and this side shaft is connected to a dynamometer and the speed of the side shaft is regulated in a control unit,
wherein in a simulation model a longitudinal force of a tire of a vehicle wheel, represented as $F_{Xi}$, is simulated with the simulation model, and a setpoint speed of the dynamometer to be set is calculated, and the setpoint speed is transferred to the control unit as a setpoint value of the speed control of the dynamometer,
characterized in that a torque caused by the longitudinal force, represented by $M_{Fxi}$, is calculated in the simulation model and is also transferred to the control unit, and therefrom a compensation torque, represented by $M_{Ki}$, is calculated in the control unit as a function of the torque caused by the longitudinal force and a deviation between a moment of inertia of the dynamometer, represented by $J_{Bi}$, and a moment of inertia of the simulated vehicle wheel, represented by $J_{Ri}$,
that the compensation torque is calculated from the relationship:

$$M_{Ki} = \frac{J_{Bi}}{J_{Ri}}M_{Fxi} + M_{Ri} - \frac{J_{Bi}}{J_{Ri}}M_{Bi} \text{ or}$$

$$M_{Ki} = \frac{J_{Bi}}{J_{Ri}}M_{Fxi} + \left(1 - \frac{J_{Bi}}{J_{Ri}}\right)M_{Ri},$$

with a torque acting on the side shaft, represented by $M_{Ri}$ and a torque acting on the shaft of the dynamometer, represented by $M_{Bi}$, or $$M_{Ki}=M_{Fxi}+J_{Ri}\dot{\omega}_{Ri}-J_{Bi}\dot{\omega}_{Bi} \text{ or } M_{Ki}=M_{Fxi}+(J_{Ri}-J_{Bi})\dot{\omega}_{Ri},$$

with an angular acceleration acting on the side shaft, represented by $\dot{\omega}_{Ri}$, and an angular acceleration acting on the shaft of the dynamometer, represented by $\dot{\omega}_{Bi}$, that the control unit calculates a control torque set with the dynamometer is calculated as the sum of the compensation torque and the control torque.

2. The method of claim 1, characterized in that the simulation model includes a wheel model having a tire model and a vehicle model, wherein the vehicle model calculates a longitudinal velocity the simulated vehicle and a vertical force of the vehicle wheel and transfers them to the wheel model and the wheel model having the tire model calculates the longitudinal force and transfers it to the vehicle model.

3. The method of claim 1, wherein the compensation torque is calculated using a rolling resistance torque of the tire of the vehicle wheel.

4. A drive train test stand with a drive train of a vehicle as a test specimen,
wherein the drive train on the drive train test stand is subjected to a test run,
wherein at least one side shaft of the drive train is connected with a dynamometer and a control unit is provided to control the speed of the side shaft in accordance with the specifications of the test run, and
wherein a simulation model for simulating a vehicle wheel of the vehicle is implemented on the drive train test stand that calculates a longitudinal force of the tire of the vehicle wheel, represented as $F_{Xi}$, and a setpoint speed of the dynamometer to be set,
characterized in that in the control unit a compensation unit is provided that calculates a compensation torque, represented by $M_{Ki}$, from a torque caused by the longitudinal force, represented by $M_{Fxi}$, and a deviation between a moment of inertia of the dynamometer, represented by $J_{Bi}$, and a moment of inertia of the simulated vehicle wheel, represented by $J_{Ri}$,
that the compensation torque is calculated from the relationship:

$$M_{Ki} = \frac{J_{Bi}}{J_{Ri}} M_{Fxi} + M_{Ri} - \frac{J_{Bi}}{J_{Ri}} M_{Bi} \text{ or}$$

$$M_{Ki} = \frac{J_{Bi}}{J_{Ri}} M_{Fxi} + \left(1 - \frac{J_{Bi}}{J_{Ri}}\right) M_{Ri},$$

with a torque acting on the side shaft, represented by $M_{Ri}$, and a torque acting on the shaft of the dynamometer, represented by $M_{Bi}$, or $$M_{Ki} = M_{Fxi} + J_{Ri}\dot{\omega}_{Ri} - J_{Bi}\dot{\omega}_{Bi} \text{ or } M_{Ki} = M_{Fxi} + (J_{Ri} - J_{Bi})\dot{\omega}_{Ri},$$

with an angular acceleration acting on the side shaft, represented by $\dot{\omega}_{Ri}$, and an angular acceleration acting on the shaft of the dynamometer, represented by $\dot{\omega}_{Bi}$, that a speed controller is implemented in the control unit, which calculates a control torque from the setpoint speed, and that the dynamometer sets the sum of the compensation torque and the control torque on the drive train dynamometer.

5. The drive train test stand of claim 4, wherein the compensation torque is calculated using a rolling resistance torque of the tire of the vehicle wheel.

6. The drive train test stand of claim 4, wherein the simulation model includes a wheel model having a tire model and a vehicle model, wherein the vehicle model calculates a longitudinal velocity of the simulated vehicle and a vertical force of the vehicle wheel and transfers them to the wheel model and the wheel model having the tire model calculates the longitudinal force and transfers it to the vehicle model.

7. A drive train test stand, comprising:
a drive train of a vehicle;
a dynamometer connected with at least one side shaft of the drive train;
a control unit controlling speed of the side shaft in accordance with specifications of a test run;
a simulation model simulating a vehicle wheel of the vehicle that calculates a longitudinal force of a tire of the vehicle wheel, represented as $F_{Xi}$, and a setpoint speed of the dynamometer;
a compensation unit calculating a compensation torque, represented by $M_{Ki}$, from a torque caused by the longitudinal force, represented by $M_{Fxi}$, and a deviation between a moment of inertia of the dynamometer, represented by $J_{Bi}$, and a moment of inertia of the simulated vehicle wheel, represented by $J_{Ri}$;
a speed controller calculating a control torque from the setpoint speed, and the dynamometer sets the sum of the compensation torque and the control torque;
wherein the compensation torque is calculated from the relationship:

$$M_{Ki} = \frac{J_{Bi}}{J_{Ri}} M_{Fxi} + M_{Ri} - \frac{J_{Bi}}{J_{Ri}} M_{Bi} \text{ or}$$

$$M_{Ki} = \frac{J_{Bi}}{J_{Ri}} M_{Fxi} + \left(1 - \frac{J_{Bi}}{J_{Ri}}\right) M_{Ri},$$

with a torque acting on the side shaft, represented by $M_{Ri}$, and a torque acting on the shaft of the dynamometer, represented by $M_{Bi}$; or $$M_{Ki} = M_{Fxi} + J_{Ri}\dot{\omega}_{Ri} - J_{Bi}\dot{\omega}_{Bi} \text{ or } M_{Ki} = M_{Fxi} + (J_{Ri} - J_{Bi})\dot{\omega}_{Ri},$$

with an angular acceleration acting on the side shaft, represented by $\dot{\omega}_{Ri}$, and an angular acceleration acting on the shaft of the dynamometer represented by $\dot{\omega}_{Bi}$.

8. The drive train test stand of claim 7, wherein the compensation torque is calculated using a rolling resistance torque of the tire of the vehicle wheel.

9. The drive train test stand of claim 7, wherein the simulation model includes a wheel model having a tire model and a vehicle model, wherein the vehicle model calculates a longitudinal velocity of the simulated vehicle and a vertical force of the vehicle wheel and transfers them to the wheel model and the wheel model having the tire model calculates the longitudinal force and transfers it to the vehicle model.

10. A method for carrying out a test run, comprising:
arranging a drive train on a drive train test stand;
connecting at least one side shaft of the drive train to a dynamometer;
regulating a speed of the side shaft in a control unit;
simulating in a simulation model a longitudinal force of a tire of a vehicle wheel, represented as $F_{xi}$;
calculating a setpoint speed of the dynamometer to be set;
transferring the setpoint speed to the control unit as a setpoint value of the speed control of the dynamometer;
calculating a torque caused by the longitudinal force, represented by $M_{Fxi}$, in the simulation model;
transferring the torque caused by the longitudinal force to the control unit;

calculating a compensation torque, represented by $M_{Ki}$, in the control unit as a function of the torque caused by the longitudinal force, represented by $M_{Fxi}$, and a deviation between a moment of inertia of the dynamometer, represented by $JB_i$, and a moment of inertia of the simulated vehicle wheel, represented by $J_{Ri}$;

setting a torque with the dynamometer calculated as a sum of the compensation torque and a control torque calculated from the setpoint speed with the speed controller;

wherein the compensation torque is calculated from the relationship:

$$M_{Ki} = \frac{J_{Bi}}{J_{Ri}} M_{Fxi} + M_{Ri} - \frac{J_{Bi}}{J_{Ri}} M_{Bi} \text{ or}$$

$$M_{Ki} = \frac{J_{Bi}}{J_{Ri}} M_{Fxi} + \left(1 - \frac{J_{Bi}}{J_{Ri}}\right) M_{Ri},$$

with a torque acting on the side shaft, represented by $M_{Ri}$, and a torque acting on the shaft of the dynamometer, represented by $M_{Bi}$; or $$M_{Ki} = M_{Fxi} + J_{Ri}\dot{\omega}_{Ri} - J_{Bi}\dot{\omega}_{Bi} \text{ or } M_{Ki} = M_{Fxi} + (J_{Ri} - J_{Bi})\dot{\omega}_{Ri},$$

with an angular acceleration acting on the side shaft, represented by $\dot{\omega}_{Ri}$, and an angular acceleration acting on the shaft of the dynamometer represented by $\dot{\omega}_{Bi}$.

11. The method for carrying out a test run of claim 10, wherein the compensation torque is calculated using a rolling resistance torque of the tire of the vehicle wheel.

12. The method for carrying out a test run of claim 10, wherein the simulation model includes a wheel model having a tire model and a vehicle model, wherein the vehicle model calculates a longitudinal velocity of the simulated vehicle and a vertical force of the vehicle wheel and transfers them to the wheel model and the wheel model having the tire model calculates the longitudinal force and transfers it to the vehicle model.

\* \* \* \* \*